United States Patent
Morris

[19]

[11] Patent Number: 6,161,583
[45] Date of Patent: Dec. 19, 2000

[54] CONTROL VALVE

[76] Inventor: Edward J. Morris, 3236 Patterson Rd., Bay City, Mich. 48706

[21] Appl. No.: 09/326,385

[22] Filed: Jun. 4, 1999

[51] Int. Cl.[7] .................................................. F16K 11/074
[52] U.S. Cl. ................................ 137/625.21; 137/625.46
[58] Field of Search ............................ 137/625.2, 625.21, 137/625.46

[56] References Cited

U.S. PATENT DOCUMENTS

| 2,696,219 | 12/1954 | Barksdale | 137/625.21 X |
|---|---|---|---|
| 2,744,540 | 5/1956 | Erle | 137/625.21 |
| 2,938,543 | 5/1960 | Johnson | 137/625.21 X |
| 2,952,274 | 9/1960 | Anderson | 137/625.21 X |
| 2,959,330 | 11/1960 | Charbonneau | 137/625.2 |
| 3,477,207 | 11/1969 | Auger | 137/625.2 |
| 3,713,462 | 1/1973 | Bushee | 137/625.21 |
| 3,747,630 | 7/1973 | Hurrell | 137/625.46 X |
| 4,614,204 | 9/1986 | Dolejs | 137/625.46 X |
| 4,996,728 | 3/1991 | Nolan . | |
| 5,105,851 | 4/1992 | Fogelman | 137/625.46 X |
| 6,012,487 | 1/2000 | Hauck | 137/625.46 X |

*Primary Examiner*—John Rivell
*Assistant Examiner*—Meredith H. Schoenfeld
*Attorney, Agent, or Firm*—Robert L. McKellar

[57] ABSTRACT

A control valve which is useful for controlling devices without the use of direct electrical power. The control valve is configured such that it allows for the control of flowable media, such as water, hydraulic fluids, and it can also be used with gases, including air, and the like.

2 Claims, 6 Drawing Sheets

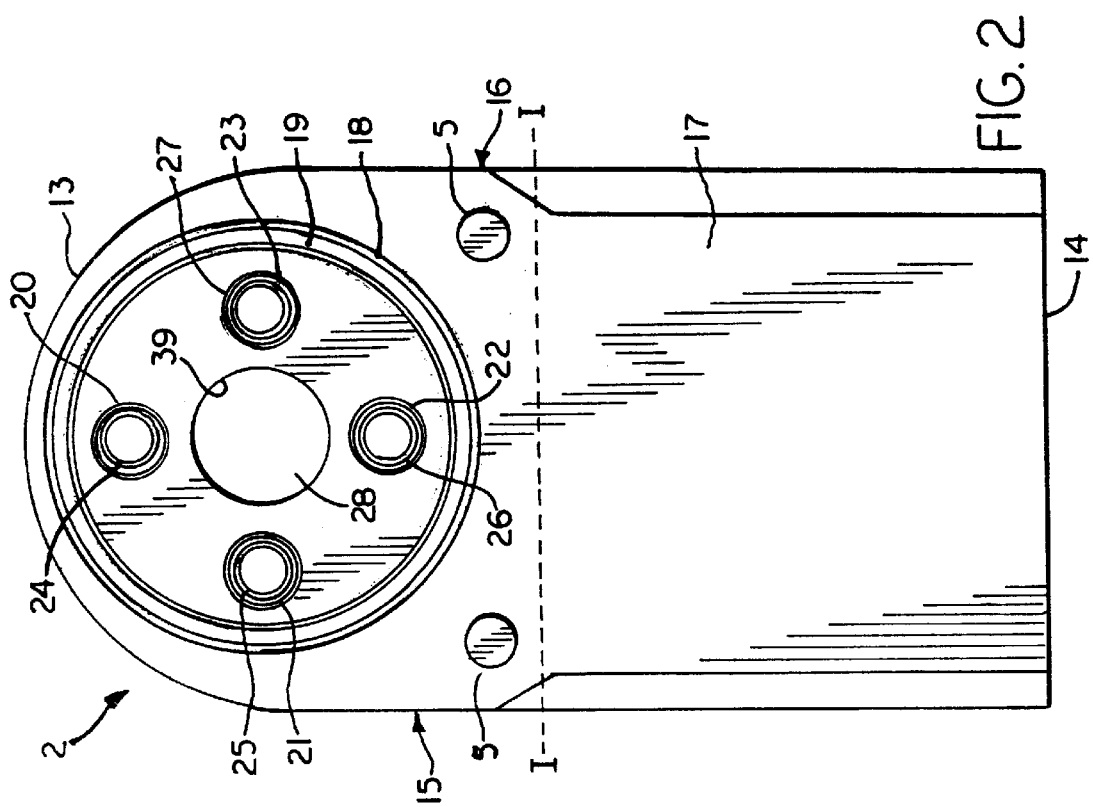
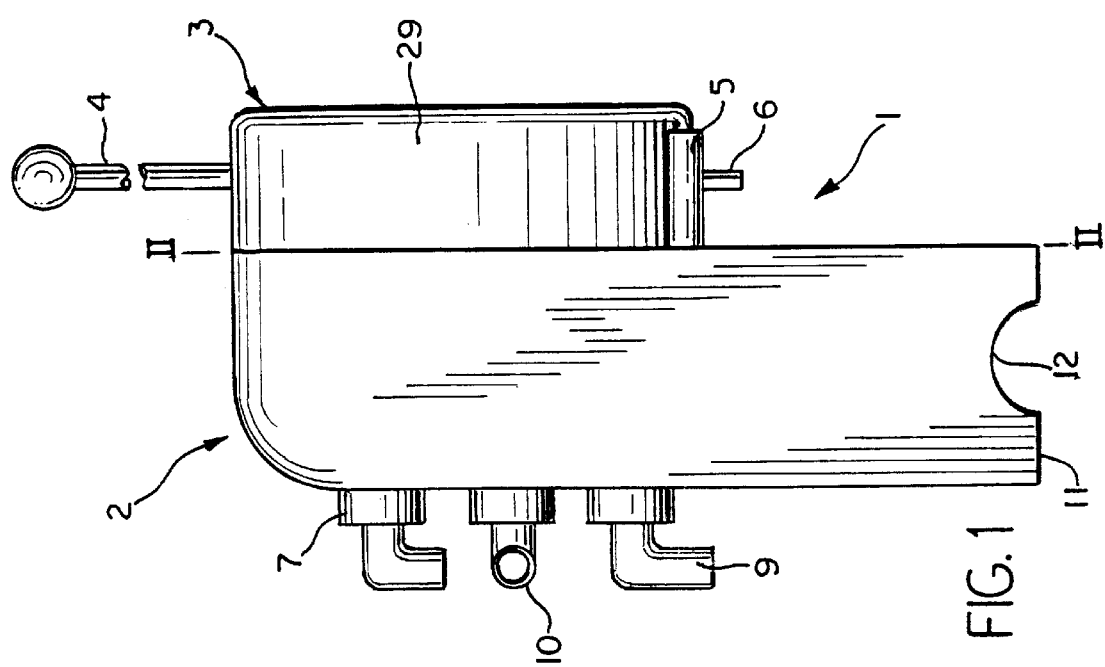

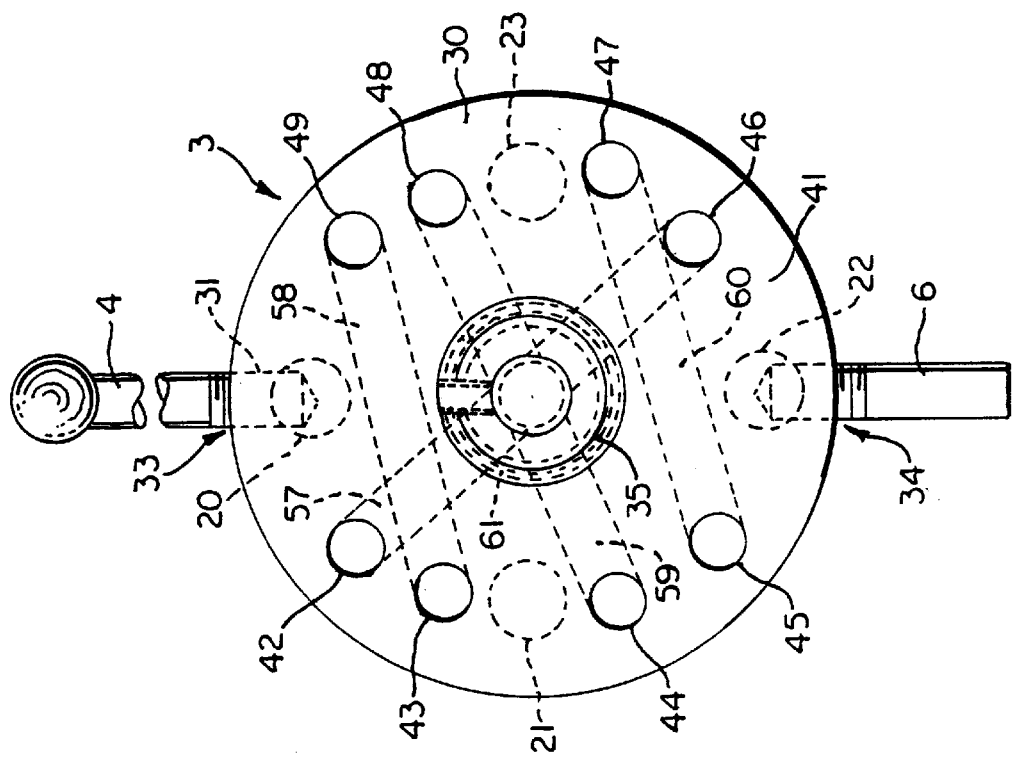
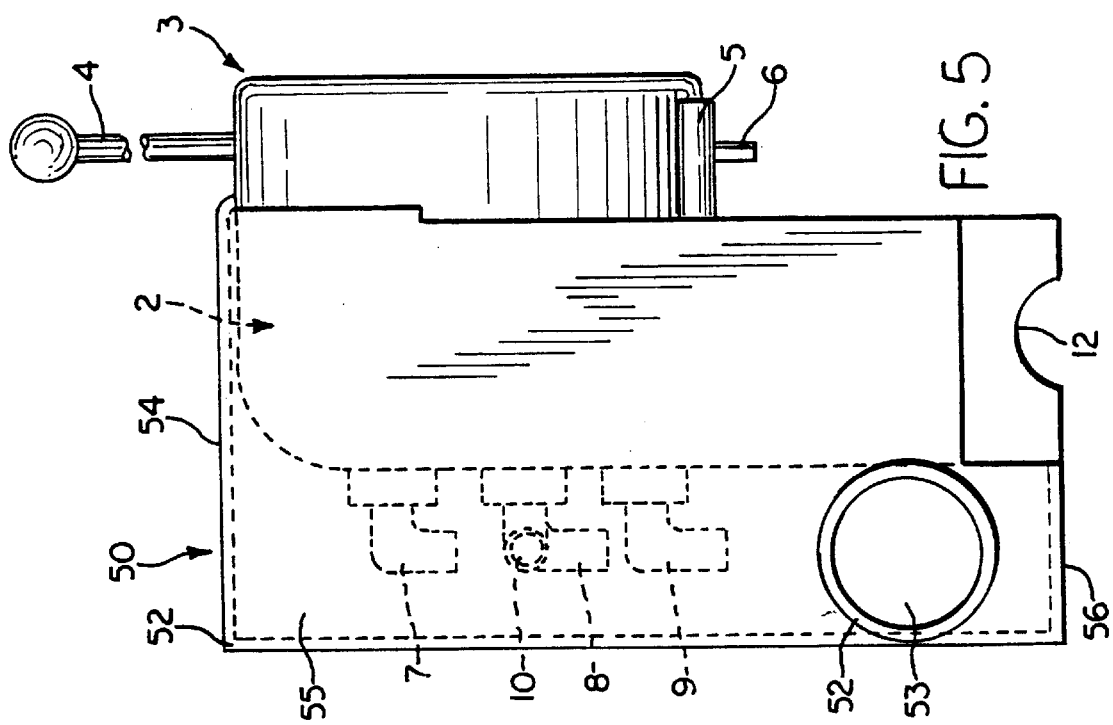

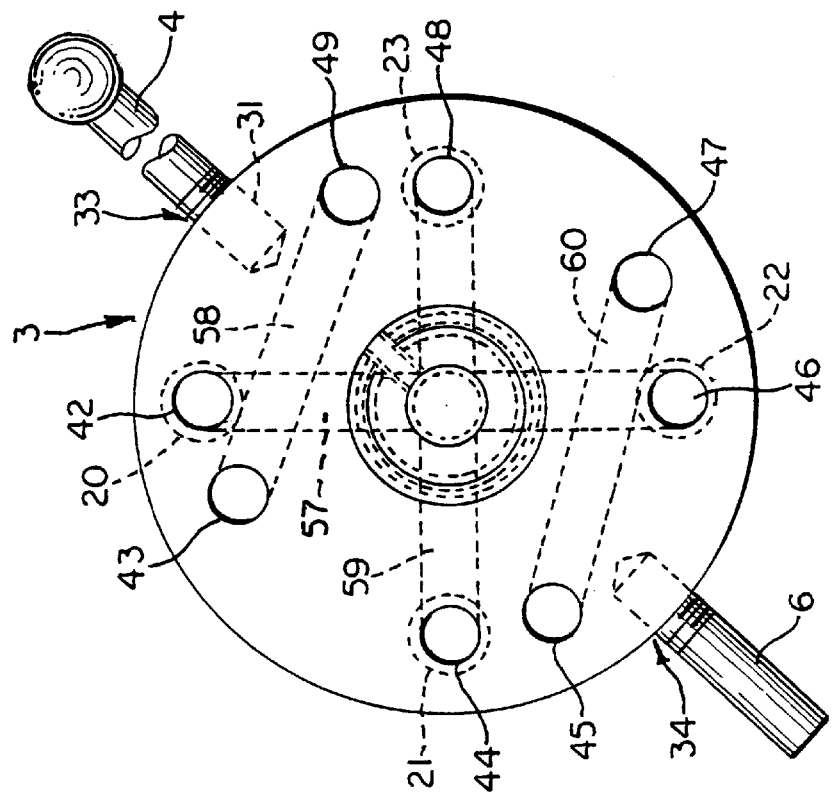
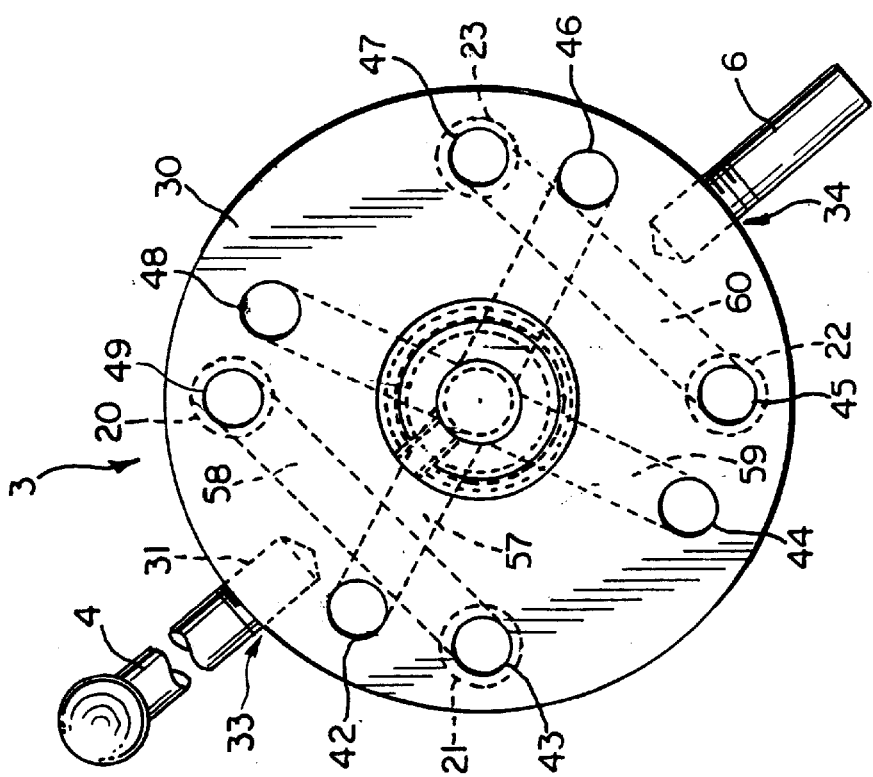

CONTROL VALVE

Be it known that Edward J. Morris, residing in Bay City, State of Michigan, a citizen of the United States of America, has invented a new and useful device which is a

CONTROL VALVE which is described in this specification.

The invention disclosed and claimed herein deals with a control valve which is useful for controlling devices without the use of direct electrical power.

The control valve is configured such that it allows for the control of flowable media, such as water, hydraulic fluids, and the like, and it is also useful for gases, including air, and the like.

Control valves of this type are convenient to use in situations wherein the use of electrical power, such as in the use of a personnel lift near a pool, is not highly desirable.

The control valves of this invention are simple in construction, easy to maintain, and are almost fool proof in operation.

It is further contemplated within the scope of this invention is provide sealing means in all of the channels in the first element.

BACKGROUND OF THE INVENTION

The inventor herein is not aware of any prior art control valves or publications that would anticipate the control valve of the instant invention.

However, even though it is contemplated by the inventor herein that the control valves of this invention have many areas of application, the inventor herein, is skilled in the manufacture of portable lift devices for moving handicapped personnel, has worked to develop a control valve that could also be used by handicapped persons to control movement of the devices that lift and transport them. One of the possible uses of such lifts is in and around bathtubs, pools, spas, physical therapy equipment and the like, all of which contain water wherein the use of an electrically controlled control valve would create a potential hazard for the occupant of the lift device. Thus, this control valve was invented.

Such lift devices can be found in at least U.S. Pat. No. 4,996,728, which issued Mar. 5, 1991 to John Nolan, which is incorporated herein for what it teaches about non-electrically controlled portable personnel lifts.

THE INVENTION

With specificity, this invention deals with a control valve for controlling the flow of a flowable medium to and from a piston.

The valve comprises two major elements, wherein there is a first element (I) which is a solid block having a front surface, a back surface having a midpoint, and, a bottom surface. The block has essentially four equally spaced-apart first apertures beginning at the front surface and exiting through the back surface. Each of the first apertures has a first circular channel surrounding the exit end to accommodate a sealing means. The block has a second aperture wherein the second aperture is essentially centered equidistantly from each of the first apertures. The second aperture begins at the front surface and exits through the back surface. The back surface has a second circular channel passing around the outside of the first apertures to accommodate a sealing means. The back surface has two stop pins located essentially at the midpoint of the back surface of the block. The stop pins are solidly fixed to the block and are essentially perpendicular to the plane surface of the block. The stop pins are positioned essentially at a point lower than the position of the lowest first aperture. The first element has a configuration in its bottom surface to accommodate a means for attaching and stabilizing the first element to a surface where it is to be used.

There is a second major element (II) which is a solid wheel, for example, a metal wheel, having a front surface and an outside surface and, having a hub centered in said front surface. The hub has a distal end and a threaded opening centered in the distal end. The hub has an outside surface and the hub has at least one circumferential channel in its outside surface to accommodate a sealing means.

The wheel has two openings in its outside surface which holes are diametrically opposed to each other. The front surface has located in it, first, second, third, fourth, fifth, sixth, seventh, and eighth openings wherein the openings first and second form a pair and are adjacent to each other; openings third and fourth form a pair and are adjacent to each other; openings fifth and sixth form a pair and are adjacent to each other and, openings seventh and eighth form a pair and are adjacent to each other, wherein the pairs are spaced essentially equidistantly from each other. The wheel has contained in its interior, communicative openings, wherein the first opening communicates with the fifth opening, the second opening communicates with the eighth opening, the third opening communicates with the seventh opening and, the fourth opening communicates with the sixth opening.

The hub of the wheel and the wheel are capable of simultaneous partial rotation in the second aperture of the first element. Also, the openings first, second, third, fourth, fifth, sixth, seventh, and eighth, interface with and communicate with the first apertures of the first element to essentially control the flow of a flowable media through the control valve by controlling the partial rotation of the wheel. The hub has a threaded rod secured in it and the threaded rod extends beyond the back surface of the first element. There is secured on the threaded rod, a threaded fastener, which allows for the first element and the second element to be secured to each other. There is an opening containing a first stabilizing means for the threaded rod in the hub, and there is an opening in the threaded fastener containing a stabilizing means for the threaded fastener on the threaded rod.

It is further contemplated within the scope of this invention is provide sealing means in all of the channels in the first element.

BRIEF DESCRIPTION OF THE DRAWINGS

FIG. 1 is a full side view of a control valve of this invention.

FIG. 2 is a full front view of the first major component of this invention, which is a solid block having apertures in the surface.

FIG. 5 is a full side view of the assembled three components from FIGS. 1, 2, and 3 wherein the component of FIG. 2 is shown in phantom.

FIG. 6 is a full back view of the component of FIG. 3, wherein the orientation of the wheel shows a neutral position with regard to the flow of media through the valve.

FIG. 7 is a full back view of the component of FIG. 3, wherein the orientation of the wheel shows a position for the movement of media through the control valve.

FIG. 8 is a full back view of the component of FIG. 3, wherein the orientation of the wheel shows another position for the movement of the media through the control valve.

DETAILED DESCRIPTION OF THE INVENTION

Figure 3:
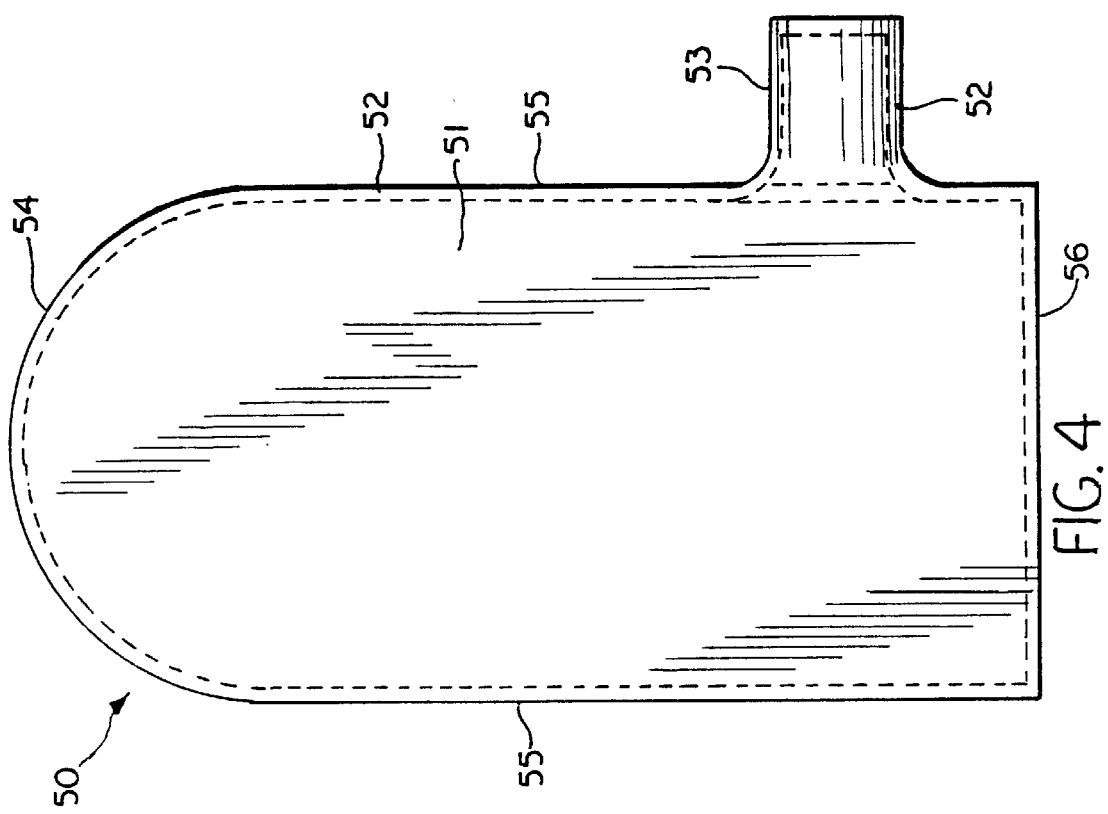
FIG. 3 is a full back view of a second major component of this invention, which is a solid wheel containing apertures in the surface.

There is shown in FIG. 1, a full side view of a control valve 1 of this invention without the cover to be described infra. Thus, there is shown in FIG. 1 the major component 2, which is a solid block which for illustration purposes is made of plastic. In addition, there is shown the second major component 3, which is a solid wheel, which for illustration purposes is made of metal. There is also shown a control handle 4, a stop pin 5, a stop peg 6, and spigots 7, 8, 9, and 10. Shown at the extreme bottom 11 of the block 2, is an arched channel 12, which conforms to a rail (not shown) for attaching and stabilizing the control valve in position for use. The configuration of the channel 12 is not critical and depends on the surface to which the control valve 1 is attached, and thus, it can be square, or rectangular, or also have a flat configuration.

It should be noted that the components 2 and 3 interface tightly with each other at point II, the essence of which will be described infra.

Turning to FIG. 2, there is shown a full back view of component 2 of this invention. Although the dimensions of the control valve are not critical, it is contemplated within the scope of this invention that the block 2 has dimensions ranging on the order of three to four inches by four to eight inches by one to three inches thick. Further, what is meant by the "plane surface" of the block is that surface which is the back surface and wherein the plane is that afforded by the FIG. 2, wherein the plane surface is the flat surface of the drawing.

There is shown a top 13, a bottom 14, sides 15 and 16 in addition to two stop pins 5 and a front surface 17. In essentially the top half of the block, denoted by a center point line I—I, of the block 2, there is shown a circular channel 18 in the front surface 17. This channel 18 is used to contain a sealing means 19, which, when the components 2 and 3 are assembled and operating, provides a seal against the escape of media to the outside of the control valve 1.

There is also shown four apertures 20, 21, 22, and 23, which run through the block 2 and exit at the back of the block. Contained around each of the four apertures 20, 21, 22, and 23, are a sealing means, respectively, 24, 25, 26, and 27, which prevents media from escaping from the apertures 20, 21, 22, and 23 and moving into the interface between components 2 and 3, when assembled and operating.

With respect to the size of the four apertures 20, 21, 22, and 23, there is shown yet a second aperture 28, which is centered in the block 2, and which is essentially equidistant from the four apertures 20, 21, 22, and 23. The second aperture 28 runs through the block 2 and exits the back surface (exit point not shown in FIG. 2).

With respect to FIG. 3, there is shown a full back view of the component 3, the wheel 30. The control handle 4 is shown as well as is the stop peg 6. It should be noted that the control handle 4 and the stop peg 6 are diametrically opposed to each other and are in the outside edge surface 29 (shown in FIG. 1) of the wheel 30. There is provided holes 31 for the control handle 4 and 32 for the stop peg 6, both of which are shown in phantom in FIG. 3. The control handle 4 and the stop peg 6 can be threaded into such holes, or can be glued therein, or can be welded, or fastened by any other convenient means, which means is not critical for this invention.

FIG. 3 is shown in the drawing as being essentially vertical and this orientation is critical to the reader in order to understand the operation of the control valve 1, as it is discussed infra.

Thus, the top of the component 3 is shown at 33 and the bottom of the component 3 is shown at 34. There is shown centered in the wheel 30, a raised hub 35, and the hub 35 has a centered aperture 36, which is threaded as shown by threads 37. The hub 35 has an outside surface 38 which interfaces tightly with the inside surface 39 (shown in FIG. 2) of the centered aperture 28 and the hub 35 is freely rotatable therein.

Shown in phantom in FIG. 3, is a circular channel 40 in the outside surface 38, which channel contains a sealing means 61 (shown in phantom in FIG. 6).

Shown in the back surface 41 of the wheel 30 are eight holes which are designated 42, 43, 44, 45, 46, 47, 48, and 49. These openings do not run through the entire wheel 30, and as will be clear upon discussion infra, the holes have varying depths, and some of them are connected by communicative channels.

Figure 4:
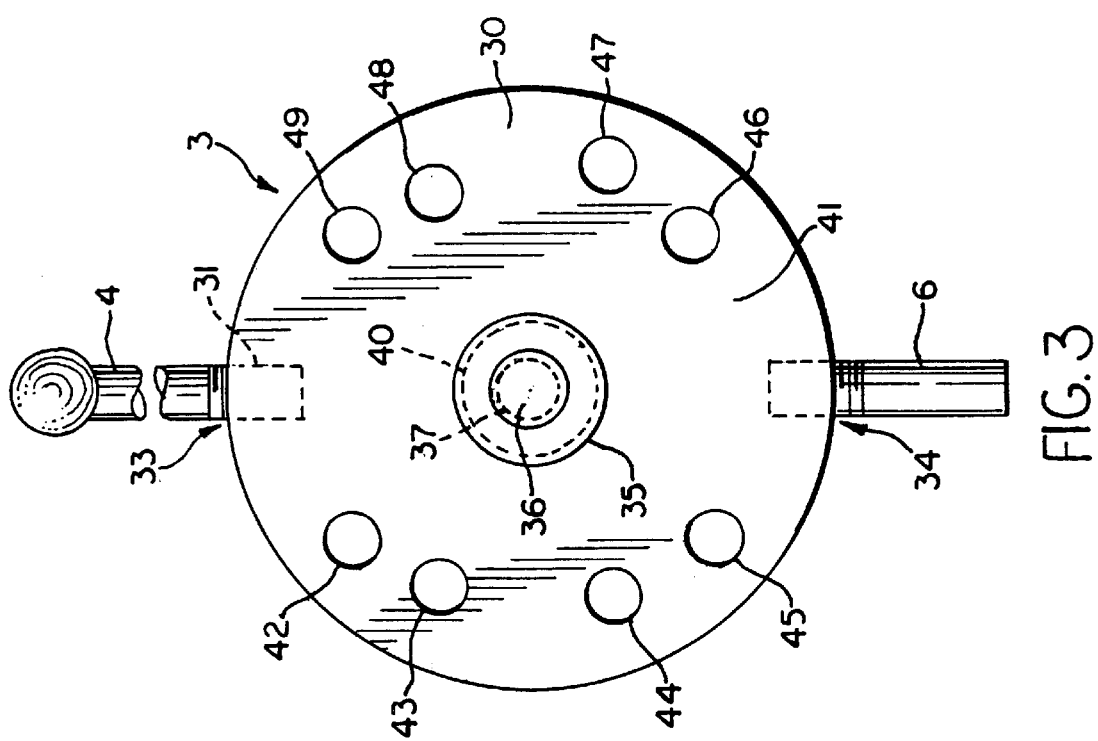
FIG. 4 is a full front view of a cover for the solid block of FIG. 2
Figure 10:
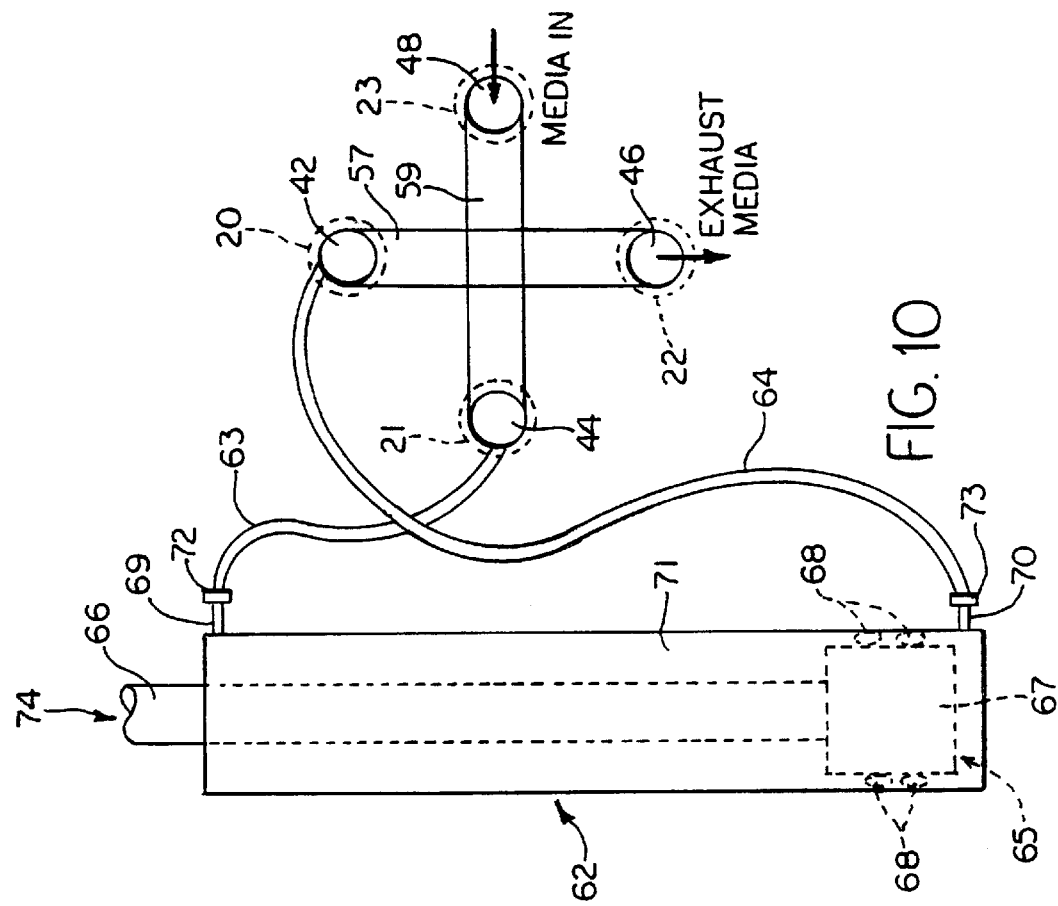
FIG. 10 is a schematic view of the flow of media through the control valve into and out of an apparatus when the control valve is operated at yet another setting.

The final major component of this invention is the cover 50 for the block 2. This component of the invention is not critical, and the control valve 1 could successfully operate without it. However, a complete valve can contain the cover 50, which is shown in FIG. 4, which is a full front view of the cover 50 showing a hollow area 51 having walls 52, a top 54, sides 55 (shown in FIG. 5), and bottom 56. The back of the cover 50 is open to allow the insertion of the solid block 2 therein. It also has a side outlet port 53, which accommodates hoses (not shown) that are passed therethrough and attached to spigots 7, 8, 9, and 10, (FIG. 5). Hoses 63 and 64 are attachable to apparatus 62, as will be discussed infra. FIG. 10

FIG. 5 is a full side view of the control valve 1 of this invention having the cover 50 in place. There is shown the component 2 partially in phantom, component 3, arching channel 12, walls 52, side port 53, spigots 7, 8, 9, and 10, it being understood that spigot 8 is mostly covered by spigot 10 in this view, top 54 and bottom 56 of the cover 50, stop pin 5, stop peg 6, and control handle 4, all of which help clarify how the components fit together for operation.

Figure 11:
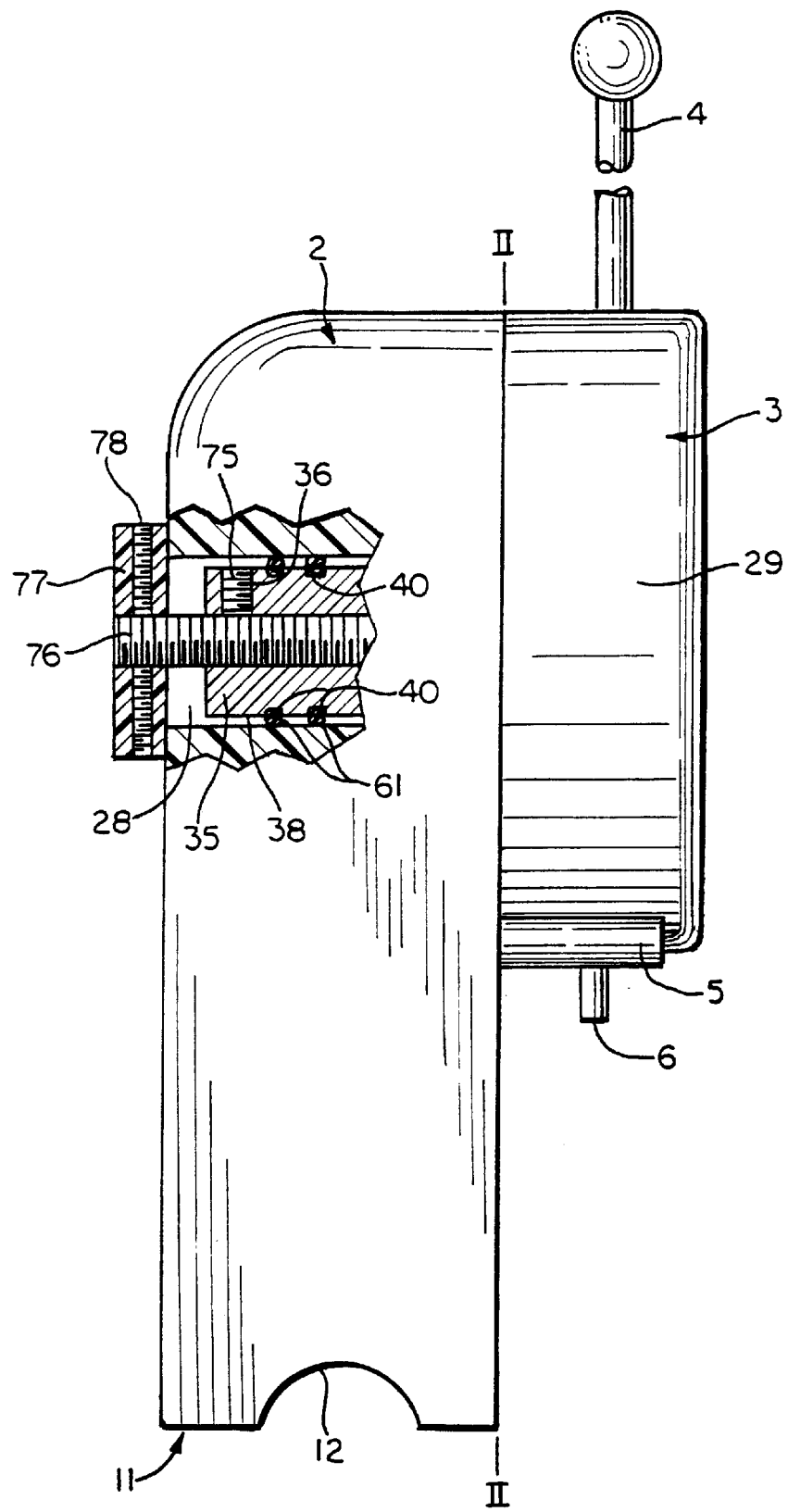
FIG. 11 is a full side view of the control valve 1 wherein like numbers have like meanings as shown in FIGS. 1 to 10.

In FIG. 11, there is shown in phantom one apparatus which can be used to secure the components 2 and 3 together for operation. There is shown the large opening 28 through the block 2, the hub 35 of component 2, the sealing means 61 in channels 40, a threaded rod 76, a retainer means 77, and a threaded fastener 78. In addition, there is the threaded hole 36 in hub 35, and contained in the threaded hole 36 is a threaded set screw 75.

The apparatus is assembled by mating components 2 and 3 as set forth above. The threaded rod 76 is threaded into the hub 35 and tightened. The component 3 is then mated interfacially with component 2 such that the open end of the threaded rod 76 projects through the large opening 28 and extends through the component 2. The threaded rod 76 projects beyond the opening 28 such that the retainer means 77 can be screwed into place on the threaded rod 76, and up against the component 2 back outside wall. The retainer means 77 is then clamped onto the threaded rod 76 by means of the threaded fastener 78 which is threaded into the retainer means 77 which draws the retainer means 77 together in a clamping mode on the threaded rod 76 thereby locking the components 2 and 3 together.

Turning now to the operation of the control valve 1, there is shown in FIG. 6, a full back view of the component 3 in the neutral position. By "neutral" position, it is meant that the component 3 is positioned with respect to component 2 so that no media flows through the control valve 1. This configuration and orientation with regard to FIG. 6, wherein the control handle 4 is vertical, is just for discussion purposes, and it is contemplated within the scope of this invention to provide for the most convenient configuration for neutral, that is, with the wheel 30 turned one direction from neutral as shown in FIG. 6, to either the right or left (while viewing from the back of the wheel 30), or with the wheel 3 turned the opposite direction from neutral as shown in FIG. 6.

Thus, with reference to FIG. 6, wherein the component 3 is in the neutral position, that is, wherein the control handle 4 and the stop peg 6 are vertical and diametrically opposed, there is shown in phantom, channels 57, 58, 59, and 60, wherein channel 57 communicatively connects holes 42 and 46, channel 58 communicatively connects holes 43 and 49, channel 59 communicatively connects holes 44 and 48 and channel 60 communicatively connects holes 45 and 47, it being understood that none of the channels communicate with each other nor with any of the holes in the arrangement not set forth just supra. It should be further understood that this arrangment of holes and channels must be precise with regard to the relative position of each of the holes to the rest of the holes.

It should be noted that the apertures 20, 21, 22, and 23 (superimposed in phantom on the back surface 41 of the component 3) in the back surface 41 of the plastic block 2 are arranged in a symmetrical pattern such that aperture 20 is in the top vertical position in the block 2 (for purposes of the discussion herein), 22 is in the bottom vertical position in the block 2, and apertures 21 and 23 are equidistant from apertures 20 and 22, and are positioned laterally, aperture 21 on the right of the device (left side of the FIG. 6), and aperture 23 on the left of the device (right side of the FIG. 6).

When the block 2, and the component 3 are positioned together such that the back surface 41 of the component 3 interfaces intimately with the front surface 17 of component 2, there is no direct alignment of any of the holes 42, 43, 44, 45, 46, 47, 48, or 49, of component 3 with any of the apertures 20, 21, 22, or 23 of component 2. This is the neutral position wherein no media flows through the control valve 1.

However, when the control handle 4 is moved to the right (from the perspective of the user, which is directed to the back of the Figure) it is shown in FIG. 7, that this position causes the hole 49 to align with aperture 20 (spigot 7), hole 45 to align with aperture 22 (spigot 9), hole 43 to align with aperture 21 (spigot 8), and hole 47 to align with aperture 23 (spigot 10), such that media flows into the component 3 through hole 47 (spigot 10) through the channel 60 to hole 45, which when connected to a hose 64 (see FIG. 9), allows the flow of the media out the back of the component 3 through spigot 9 to the apparatus 62, via coupler 73, and exit/entry port 70 which apparatus 62 contains a piston arrangement 65 which will be described in detail infra. Simultaneously, this alignment aligns hole 49 with aperture 20 (spigot 20), and hole 43 with aperture 21 (spigot 8), allows for a flow of media from the apparatus 62 through spigot 8 and hole 43 through the component 3 via channel 58 to hole 49 and spigot 7 to exit the device.

Further, when the control handle 4 is moved to the left as is shown in FIG. 8 (again, from the perspective of the user), hole 48 aligns with aperture 23 (spigot 10), hole 44 aligns with aperture 21 (spigot 8), hole 42 aligns with aperture 20 (spigot 7), and hole 46 aligns with aperture 22 (spigot 9), to allow for the flow of media from hole 48 through channel 59 to hole 44 and then into the apparatus 62 while media exits the apparatus 62 through hole 42, via channel 57 to hole 46, aperture 22 and exhausting through spigot 9.

Figure 9:
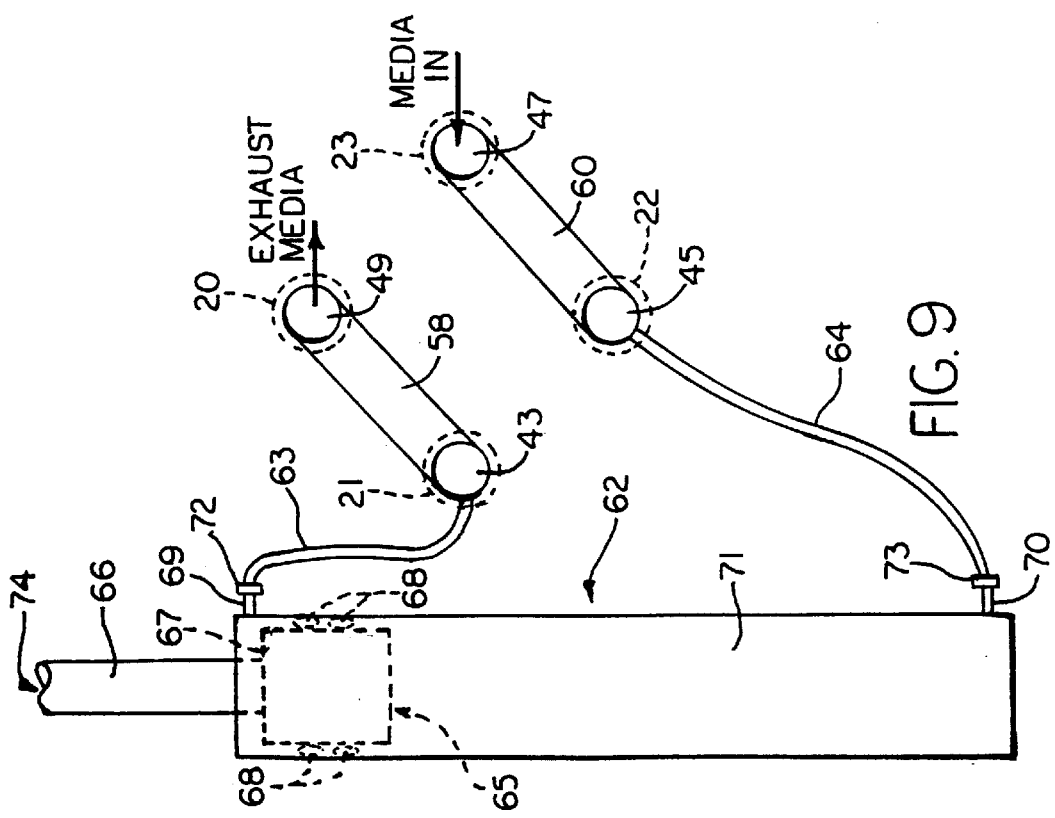
FIG. 9 is a schematic view of the flow of media through the control valve into and out of an apparatus when the control valve is operated at one setting.

To give a clear explanation of the operation of the control value in conjunction with the apparatus 62, there is shown in FIG. 9, a schematic view of such an arrangement wherein there is an apparatus 62, having a housing 71, which contains a piston arrangement 65 shown in phantom, which consists of a piston 67, sealing means 68 around the outside surface of the piston 67, a piston push rod 66, and not shown in phantom, exit/entry ports 69 and 70, hose couplers 72 and 73, along with hoses 63 and 64.

With regard to the right hand side of the schematic, there is shown the valve arrangement when the valve is positioned as shown in FIG. 7. Media enters the control valve 1 through spigot 10 (not shown in FIG. 9), and into aperture 23, through hole 47, through channel 60 to hole 45, through aperture 22 and out spigot 9 (not shown in this Figure). Upon exiting spigot 9, the media flows through hose 64 to the bottom of the apparatus 62 to exit/entry port 70, and then into the housing 71, pushing the piston 67 to the top of the apparatus 62, which causes the expulsion of media above the piston 67 through the exit/entry port 69, through hose 63, into spigot 8, into hole 43 and on into aperture 21, through channel 58 to the hole 49, through aperture 20, and out spigot 7 to exit from the entire apparatus.

There is shown in FIG. 10, a schematic view of another arrangement wherein there is an apparatus 62, having a housing 71, which contains a piston arrangement 65 shown in phantom, which consists of the piston 67, the sealing means 68 around the outside surface of the piston 67, the piston push rod 66, and not shown in phantom, the exit/entry ports 69 and 70, the hose couplers 72 and 73, along with the hoses 63 and 64.

With regard to the right hand side of the schematic, there is shown the valve arrangement when the control valve 1 is positioned as shown in FIG. 8. Media enters the control valve 1 through spigot 10 (not shown in this Figure), and into aperture 23, through hole 48, through channel 59 to hole 44, through aperture 21 and out spigot 8 (also not shown in this Figure). The media moves from spigot 8 through hose 63 to exit/entry port 69 and on into the housing 71 of the apparatus 62, whereupon the media forces the piston 67 to the bottom of the housing 71, which forces the media to move into the exit/entry port 70, through the hose 64, into the hole 42, through aperture 20, into channel 57, to hole 46, out of aperture 22 to be exhausted through spigot 9 from the entire apparatus.

The movement of the piston 67 during the above-mentioned operations causes the piston rod 66 to move simultaneously in the same direction as the piston 67, and also causes movement or motion to whatever is attached to the opposite end 74 of the piston rod 66 thereby creating control over the apparatus that is attached to the end 74 of the piston rod 66. Such an apparatus can be, for example, the portable lift mentioned supra, disclosed in U.S. Pat. No. 4,996,728.

What I clam is:

1. A control valve for controlling the flow of a flowable medium to and from a piston, said valve comprising;

(I) a first element which is a solid block having a plane surface, a front surface, a back surface having a midpoint, and, a bottom surface; said block having essentially four equally spaced-apart first apertures running from the front surface and exiting through the back surface thereof; each said first aperture having a first circular channel surrounding the exit to accommodate a sealing means; said block having a second aperture, said second aperture essentially centered equidistantly from each of the first apertures, said second aperture running from the front surface and exiting through the back surface thereof; said back surface having a second circular channel passing around the outside of the first apertures to accommodate a sealing means; said back surface having two stop pins located essentially at the midpoint of the back surface of the block and standing essentially perpendicular to the plane surface of the block and essentially at a point lower than the position of the lowest first aperture; said first element having a configuration in its bottom surface to accommodate a means for attaching and stabilizing the first element to a surface;

(II) a second element which is a solid metal wheel having a front surface and an outside surface and, having a hub centered in said front surface; said hub having distal end and a threaded opening centered in the distal end; said hub having an outside surface, said hub having at least one circumferential channel in its outside surface to accommodate a sealing means;

said wheel having two openings in its outside surface which are diametrically opposed to each other;

said front surface having located therein a first, second, third, fourth, fifth, sixth, seventh, and eighth holes wherein holes first and second form a pair and are adjacent to each other; holes third and fourth form a pair and are adjacent to each other; holes fifth and sixth form a pair and are adjacent to each other and, holes seventh and eighth form a pair and are adjacent to each other, wherein the paired holes are spaced essentially equidistantly from each other and wherein there is contained in the interior of the wheel, communicative channels wherein the first hole communicates with the fifth hole, the second hole communicates with the eighth hole, the third hole communicates with the seventh hole and, the fourth hole communicates with the sixth hole;

the hub of the wheel and the wheel being capable of simultaneous partial rotation in the second aperture of the first element and wherein the openings first, second third, fourth, fifth, sixth, seventh, and eighth, interface with and communicate with the first apertures of the first element to essentially control the flow of a liquid through the control valve by controlling the partial rotation of the wheel, said hub having a rod secured therein, said rod extending beyond the back surface of the first element and having secured thereon a retainer which allows for the first element and the second element to be secured to each other, wherein there is an opening containing a first stabilizing means for the rod in the hub, and wherein there is an opening in the retainer containing a stabilizing means for the retainer on the rod.

2. A control valve as claimed in claim 1 wherein the first element is manufactured from plastic and the second element is manufactured from metal.

* * * * *